J. A. SOUTHWELL.
SHOVEL.
APPLICATION FILED JULY 17, 1917.
1,261,638.
Patented Apr. 2, 1918.
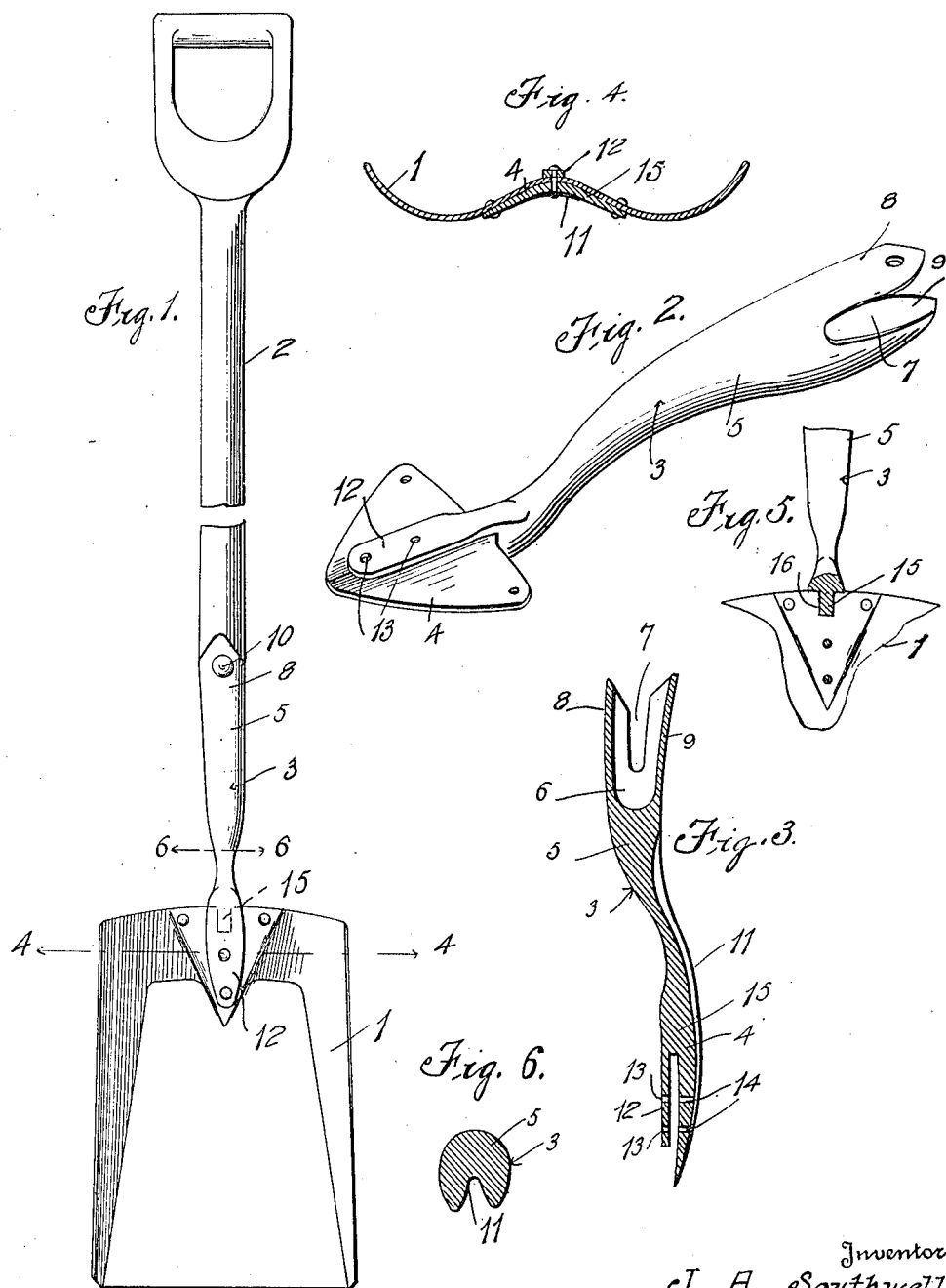

UNITED STATES PATENT OFFICE.

JOHN A. SOUTHWELL, OF WEST PITTSTON, PENNSYLVANIA.

SHOVEL.

1,261,638.  Specification of Letters Patent.  Patented Apr. 2, 1918.

Application filed July 17, 1917. Serial No. 181,085.

*To all whom it may concern:*

Be it known that I, JOHN A. SOUTHWELL, a citizen of the United States, residing at West Pittston, in the county of Luzerne and State of Pennsylvania, have invented certain new and useful Improvements in Shovels; and I do hereby declare the following to be a full, clear, and exact description of the invention, such as will enable others skilled in the art to which it appertains to make and use the same.

This invention relates to shovels and more particularly to a device employed for attaching the handle of a shovel to the blade of the same, and the primary object of the invention is to provide a handle attaching device which is constructed of a single piece of malleable iron, so as to provide a maximum strength and durability together with lightness of weight and simplicity of construction.

A further object of this invention is to provide a handle fastening device as specified having a substantially triangularly shaped blade formed thereon above which is spaced a tongue that overhangs the center of the substantially triangularly shaped plate and extends to within a very short distance of the apex of the plate, being adapted to be positioned upon the opposite side of the shovel blade from the triangular plate and further to provide a tongue which is formed integrally with the triangular plate at its base and with the tongue and seats in a notch formed in the blade of the shovel.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawing wherein like characters designate like and corresponding parts throughout the several views, and in which—

Figure 1 is a view of a shovel showing the improved handle fastening device applied thereto, Fig. 2 is a perspective view of the handle fastening device, Fig. 3 is a longitudinal section through the handle fastening device, Fig. 4 is a section on the line 4—4 of Fig. 1, Fig. 5 is a detail section illustrating in plan the tongue formed upon the handle fastening device and the manner in which it seats within a notch formed in the shovel blade, and Fig. 6 is a section on the line 6—6 of Fig. 1.

Referring more particularly to the drawing, 1 designates the shovel blade, which may be of any ordinary type of shovel now commonly employed, and 2 indicates the handle of the shovel which is also of any ordinary type now employed. The handle 2 is connected to the blade 1 of the shovel by the improved handle fastening device generically indicated by the numeral 3.

The handle fastening device 3 includes a substantially triangularly shaped plate 4 which is bent or shaped in cross section to fit within the strengthening median corrugation formed in the shovel blade 1 as clearly shown in Fig. 4 of the drawing, and it has a socket piece 5 formed thereupon. The socket piece 5 is provided with a recess 6 which receives the lower end of the handle 2. The recessed portion of the socket piece 5 is split as shown at 7, providing tongues 8 and 9 which are secured, through the medium of rivets or bolts 10 to the handle 2. The socket piece 5 of the shovel handle fastening device is provided with a longitudinally extending cut out portion 11 formed in its under face which gives the majority of this portion a substantially U-shape thereby increasing the strength of the same and decreasing the weight.

A tongue 12 is formed integrally with the socket piece 5 and extends outwardly over the median line of the substantially triangular plate 4, being spaced therefrom so that it will engage the surface of the shovel blade 1 oppositely to the surface engaged by the plate 4. The tongue 12 extends to within a short distance of the apex of the plate 4 and it is provided with a pair of openings 13 which receive rivets or suitable pins for attaching the handle attaching member to the blade 1. The openings 13 aline with openings 14 formed in the triangular plate 4. A tongue 15 is formed integrally with the socket piece 5 and extends between the tongue 12 and plate 4. The tongue 15 is narrower than the tongue 12 and fits within a notch 16 formed in the blade 1, so as to prevent accidental movement of the blade and also to insure the proper positioning of the handle fastening device with respect to the blade 1.

In reducing the invention to practice, certain minor features of construction, combination, and arrangement of parts may necessitate alterations to which the patentee is entitled provided such alterations are comprehended within the scope of what is claimed.

What is claimed is:—

A handle fastening device for shovels formed of a single malleable casting and comprising a socket piece having a substantially triangularly shaped plate formed thereon, a tongue formed upon said socket piece and extending over the median line of said triangular plate and being spaced therefrom, said tongue extending to within a short distance of the apex of the triangular plate, said tongue and triangular plate provided with a plurality of alining rivet receiving openings, a tongue formed upon said socket piece and projecting between said first named tongue and said substantially triangular plate, said last named tongue being narrower than said first named tongue and adapted to seat within a notch formed in a shovel blade, said socket piece provided with a recess formed in its outermost end and with a longitudinally extending substantially V-shaped cut out portion formed in its under side.

In testimony whereof I affix my signature in presence of two witnesses.

JOHN A. SOUTHWELL.

Witnesses:
HAROLD J. MAHON,
MARY MOFFITT.

Copies of this patent may be obtained for five cents each, by addressing the "Commissioner of Patents, Washington, D. C."